Aug. 17, 1926.

G. W. MASON 1,596,286

HYDRAULIC BRAKE

Filed Feb. 12, 1925

Inventor
GEORGE W. MASON

By Jing Harness
Attorney

Patented Aug. 17, 1926.

1,596,286

UNITED STATES PATENT OFFICE.

GEORGE W. MASON, OF DETROIT, MICHIGAN.

HYDRAULIC BRAKE.

Application filed February 12, 1925. Serial No. 8,600.

It is the primary object of my invention to provide a hydraulic brake device that is simple of construction and very cheap to manufacture.

At the present time hydraulic brakes either have a piston and piston housing or a fluid chamber attached to each brake so that the pressure of the fluid may be exerted on the braking mechanism.

It is therefore another object of my invention to provide a fluid braking device that does not require a piston on each brake and one that will eliminate the attaching of a number of parts to either the wheel or the brake housing.

With the above, and other objects, in view, my invention consists in the arrangement, combination and construction of the various parts of my improved device as described in the specification, claimed in my claims and shown in the accompanying drawings, in which:

Figures 1, 2:
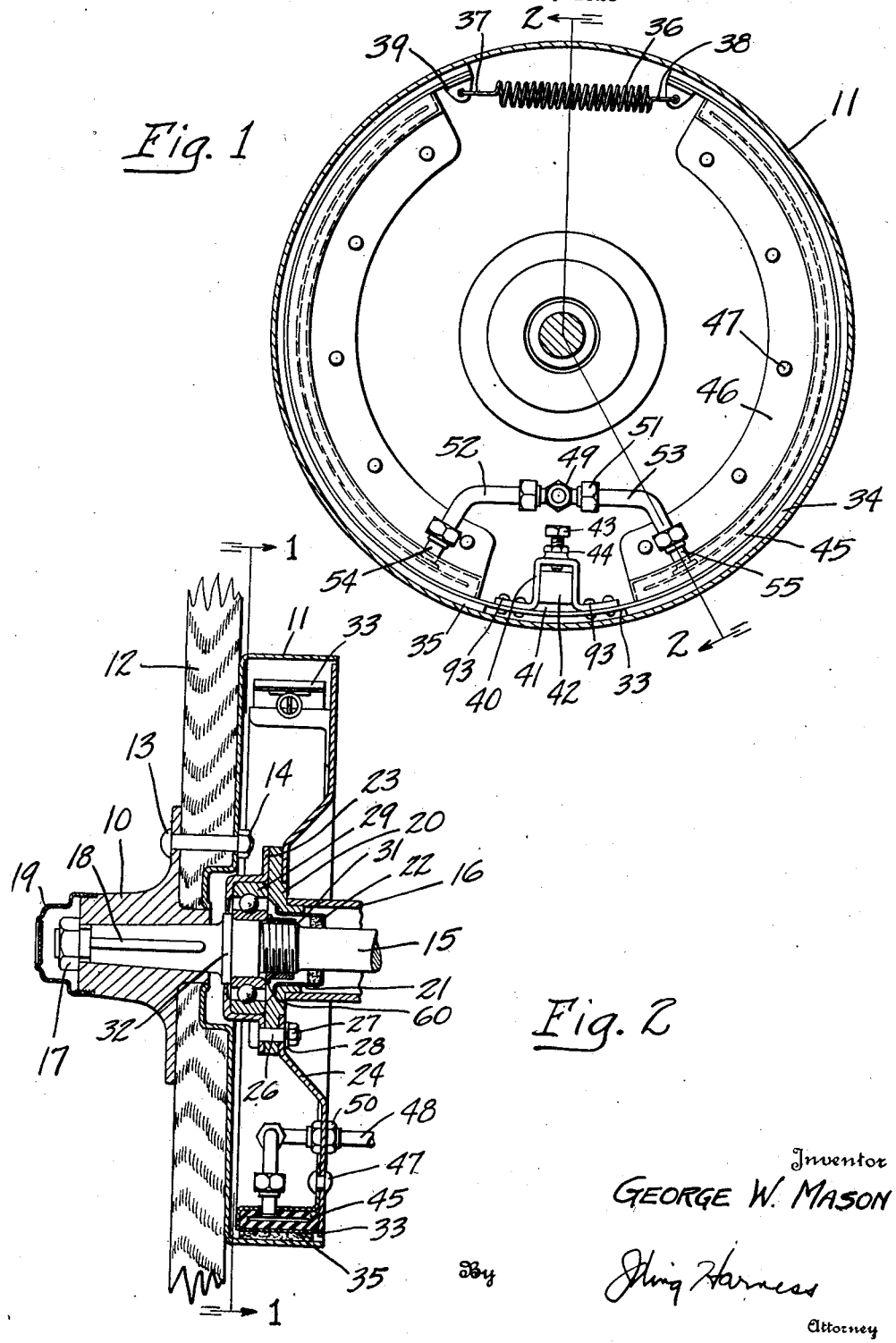
Fig. 1 is a sectional view through a brake drum, on line 1—1 of Fig. 2, showing, in elevation, my improved device.
Fig. 2 is a sectional view taken on line 2—2 of Fig. 1.

I have shown in the construction of my improved device a conventional hub 10 and the conventional brake drum 11 secured to a conventional wheel 12 by means of the bolts 13 and the nuts 14. A shaft 15 having the housing 16 is made secure to the hub 10 by means of the drive shaft nut 17 and the hub key 18. A hub cap 19 is placed on the hub 10. Secured to the housing 16 is the drive shaft bearing retainer 20 that has the shaft felt retainer 21 with the felt washer 22 therein fastened thereto.

A bearing cap 23 and the dust shield 24 are secured to the retainer 20 by the bolts 26, the washers 28 and the nuts 27. A bearing 29 is held on the shaft 15 by means of the adapter 31 with the flanged end 60, the shank 32 on the shaft 15, the cap 23 and the retainer 20.

A flexible spring brake band 33 having the customary liners 34 and 35 on its periphery is provided on the inside of the drum 11. The band 33 is held in normally retracted position by a spring 36 that has its ends 37 and 38 secured to the eye plates 39, which are placed on the ends of the band 33.

The brake band adjustment consists of a U-shaped member 40 riveted to the band 33, as at 93. A plate 41 is placed on the retainer next to the band 33 and upon said plate 41 is a block 42. A bolt 43 with the lock nut 44 is placed in the head of the member 40 and adapted to press against the block 42 so that by turning the bolt 43 in one direction, pressure will be placed on the plate 41, thereby forcing the band 33 to bend inwardly and by turning the bolt 43 in the opposite direction, the band 33 will be allowed to expand.

Spaced within the band 33 are heavy fabric tubes 45 that are held in place by the flanged plates 46, which are secured to the dust shield 24 by rivets 47. A fluid feed pipe 48 with the T end 49 passes through the shield 24, as at 50. Placed on the ends of said T 49 by means of the nuts 51 are the pipe branches 52 and 53 that connect with the nipples 54 and 55 of the tubes 45.

Thus in the practical use of my improved device, the brake drum 11 is free to move with the wheel 12 until pressure, applied in a conventional manner, is placed on the fluid that is in the piping 48, which forces the fluid to pass through the branches 52 and 53 into the tubes 45, with the result that the flexible band 33 is forced to expand by the inflated tubes so that the liners 46 and 47 will bear against the inner periphery of the drum 11, thereby stopping the wheel.

It will be noted that the wide, relatively flat construction of the tube 45, with the correspondingly wide and flat formation of the fluid space therein, provides for well distributed braking action.

I desire it to be understood that with certain combinations of materials that portion of the band 33, between the tube 45 and the linings 34 and 35 may be eliminated, and the lining fixed directly to the tube by adhesion, or otherwise.

It is obvious that various changes may be made in the arrangement, combination and construction of the various parts of my improved device without departing from the spirit of my invention, and it is my intention to cover by my claims such changes as may be reasonably included within the scope thereof.

What I claim is:

1. In combination a brake drum, a flexible brake band, fabric tubes, means to hold said tubes in position on said band and means to inflate said tubes with liquid thereby expanding said band.

2. In combination, a brake drum, a flexible brake band, fabric tubes, flanged plates holding said tubes in position on said band, fluid feed pipes leading to said tubes, whereby pressure on the liquid in said pipes will inflate said tubes to expand said band.

3. In combination, a brake drum, a flexible brake band, fabric tubes, means to hold said tubes on said band, fluid pipes leading to said tubes, whereby pressure on the liquid in said pipes will inflate said tubes to expand said band and means, consisting of a compression spring secured to the ends of said band, to contract the same when pressure on the liquid is released.

4. In combination, a brake drum, flat flexible fabric tubes having brake liners on one side thereof, means to hold said tubes in position around the inner periphery of said drum and means to inflate said tubes with liquid, thereby forcing said liners to come in contact with said drum.

5. In combination, a brake drum, a dust shield for said drum, flanged plates secured to the inner side of said shield, flat flexible fabric tubes having brake liners on one side thereof held in position around the inner periphery of said drum by said plates, and means to inflate said tubes with liquid, thereby forcing the said liners to come in contact with said drums.

6. In combination, a brake drum, a dust shield for said drum, flanged plates secured to the inner side of said shield, relatively flat flexible fabric tubes, having relatively flat fluid spaces therein, held in position around the inner periphery of said drum by said plates, brake liners on one side of said tubes, and fluid feed pipes leading to said tubes, and whereby pressure on the liquid in said pipes will inflate said tubes and force the liners to come in contact with said drum, said flat tube forcing the liquid to return to its original position when pressure is released.

GEORGE W. MASON.